Feb. 7, 1950      O. W. LIVINGSTON      2,496,881
COMPENSATED DEGENERATIVE CONTROL CIRCUIT
Filed March 28, 1946
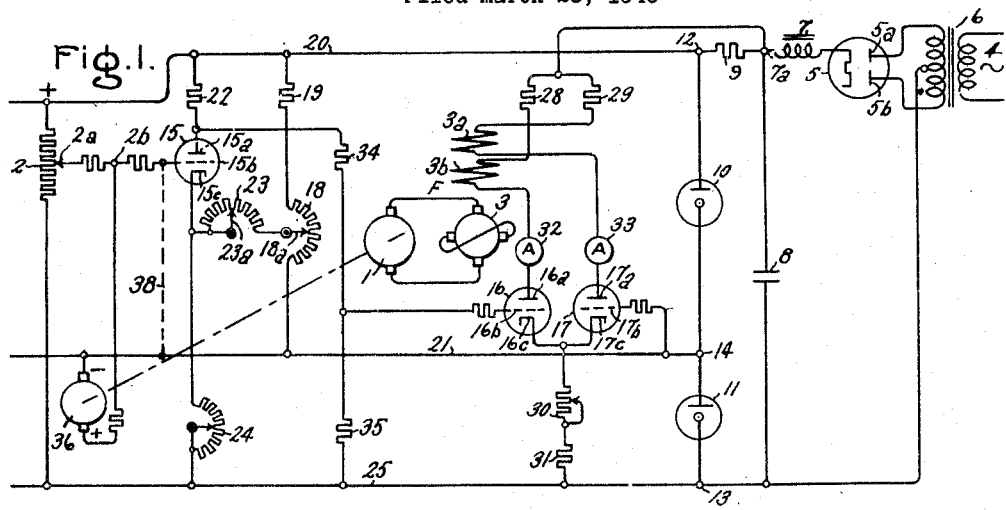
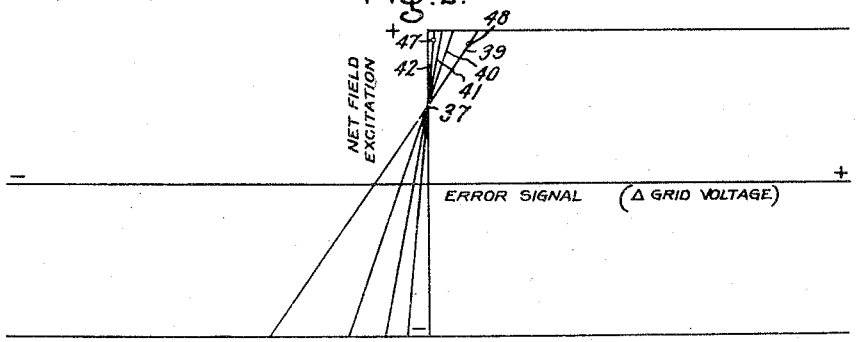
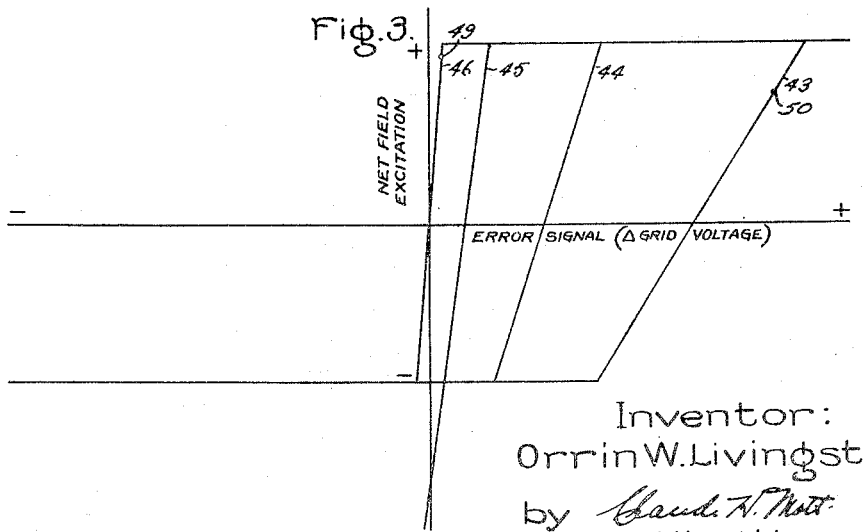
Inventor:
Orrin W. Livingston,
by *Claude N. Mott*
His Attorney.

Patented Feb. 7, 1950

2,496,881

UNITED STATES PATENT OFFICE 2,496,881

COMPENSATED DEGENERATIVE CONTROL CIRCUIT

Orrin W. Livingston, Scotia, N. Y., assignor to General Electric Company, a corporation of New York Application March 28, 1946, Serial No. 657,878

6 Claims. (Cl. 318—146)

This invention relates to control systems, more particularly to electric valve control systems for controlling the operation of electric translating devices such, for example, as dynamo electric machines, and it has for an object the provision of a simple, reliable, and improved control system of this character.

More particularly the invention relates to control systems in which means are provided for varying the sensitivity of the control, and a further object of the invention is the provision of means for eliminating variations in the output or in the controlled characteristic when the sensitivity is changed.

In carrying the invention into effect in one form thereof, an electric valve is provided for controlling an operating characteristic of an electrical translating device, e. g., a dynamo electric machine. A variable potentiometer is connected across a supply source. The anode of the electric valve is connected to the positive side of the source and the cathode is connected to an adjustable voltage point on the potentiometer. A variable resistor is connected between the cathode and the adjustable voltage point on the potentiometer for varying the sensitivity of the control. A second variable resistor is connected between the cathode and a point which is more negative than the negative side of the source to which the cathode potentiometer is connected. This variable resistor is adjusted to equalize the cathode voltage with the voltage at the adjustable voltage point on the potentiometer so that the sensitivity adjusting resistor may be varied without changing the output of the valve or the value of the controlled characteristic of the translating device.

In illustrating the invention in one form thereof it is shown as embodied in a motor speed regulating system.

For a better and more complete understanding of the invention, reference should now be had to the following specification and to the accompanying drawing in which Fig. 1 is a simple, schematic diagram of an embodiment of the invention, and Figs. 2 and 3 are charts of characteristic curves which serve to explain its operation.

Referring now to the drawing, an operating characteristic of an electrical translating device 1 is to be controlled in accordance with the setting of a suitable controlling accessory, such as the rheostat 2. The translating device may be a dynamo electric machine, such as a D.-C. motor. In the system of Fig. 1 the speed of the motor is to be maintained constant at a value corresponding to the setting of rheostat 2.

The motor 1 is supplied from a suitable generator 3. Although the generator 3 may be of any suitable type it is preferably an amplidyne. An amplidyne differs from a conventional generator in that it is an armature reaction excited machine, i. e., its main excitation is provided by the armature reaction flux produced by current flowing in an external short circuit of the armature. This short circuit current in turn is controlled by means of two control field windings 3a and 3b. The generator 3 is driven at a suitable speed which is preferably substantially constant by any suitable means such for example as an induction motor (not shown). Direct voltage for control purposes is derived from an alternating voltage source 4 by means of a small auxiliary bi-phase half wave rectifying valve 5 of which the anodes 5a and 5b are connected to opposite terminals of the secondary winding of a transformer 6, of which the primary winding is connected to the source 4. The rectified voltage is filtered by means of a smoothing reactor 7 and a capacitor 8. The voltage across the capacitor 8 is impressed on a circuit comprising a resistor 9 in series with two glow tubes 10 and 11. These glow tubes are gaseous discharge devices which operate in that region of their characteristics in which the voltage drop across their terminals is substantially constant over a wide range of current. The voltage drop across the points 12 and 13 is fixed in magnitude by the type of glow tube used, and within the operating limits of this equipment, this voltage is independent of variations in the alternating supply voltage. Any difference in voltage between the voltage across the capacitor 8 and the constant voltage across the glow tubes 10 and 11 is absorbed by the resistor 9. The constant voltages across the glow tubes 10 and 11 are used for stabilizing the voltage on the amplifier valves which are used on the control circuit and in addition, reference voltages which are used for controlling purposes are derived from the sum of these voltages.

The glow tubes 10 and 11 constitute in effect a voltage divider and it may be assumed that the voltage drop across the tubes 10 and 11 are substantially equal so that the voltage of the point 14 is midway between the voltages of the points 12 and 13.

The excitation of the control field windings 3a and 3b of the generator 3 is controlled by means of a two-stage amplifier of which the electric valve 15 constitutes the first stage and the electric valves 16 and 17 constitute the second stage.

An adjustable potentiometer 18 is connected in series with a fixed resistor 19 across the positive and intermediate voltage supply buses 20 and 21 respectively. The positive bus 20 is connected to the positive terminal 12 and the intermediate voltage bus 21 is connected to the intermediate voltage point 14 of the voltage divider.

As shown, the electric valve 15 is preferably a triode valve having an anode 15a, a control grid 15b, and a cathode 15c. The anode 15a is connected through a voltage drop in resistor 22 to the positive control bus 20. The cathode 15c is connected through a degenerative sensitivity adjusting resistor 23 to the slider 18a of the potentiometer 18. A second adjustable resistor 24 is connected between the cathode 15c and the negative control bus 25 which is connected to the negative supply terminal 13.

The second stage electric valves 16 and 17 are also triode valves provided with anodes 16a and 17a respectively, control grids 16b and 17b respectively, and cathodes 16c and 17c respectively. The anode 16a is connected through the control field winding 3b and a resistor 28 to the positive terminal 7a of the rectifier, and the anode 17a is connected through the control field winding 3a and the resistor 29 to the positive terminal of the rectifier 7a. Both cathodes 16c and 17c are connected through a variable resistor 30 and a fixed resistor 32 to the negative terminal 13. Ammeters 32 and 33 are connected in the anode circuits of the valves 16 and 17 respectively.

A pair of resistors 34 and 35 are connected in series between the anode 15a of the valve 15 and the negative control bus 25. The grid 16b of the valve 16 is connected to the junction point of the resistors 34 and 35, and the grid 17b of valve 17 is connected to the intermediate control voltage bus 21.

The initial grid bias of the valve 15 is so chosen that with the slider 2a of the speed adjusting rheostat in the central or zero position, the valve 15 is conducting approximately in the middle of the useful range, i. e., the linear portion of the characteristic. The slider 18a is then adjusted until the currents conducted by valves 16 and 17 are equal.

The purpose of rheostat 30 is to control the sum of the currents in valves 16 and 17 which remains substantially constant as the relative values of current conducted by valves 16 and 17 change.

The control field windings 3a and 3b are connected in the anode circuits of the valves 16 and 17 so that their excitations oppose each other. Thus, with the valves 16 and 17 conducting approximately equal values of current, the control field windings 3a and 3b are equally and oppositely excited. Consequently, the net excitation of the two fields is zero so that the voltage of the generator 3 is zero and the motor 1 is at standstill.

If the voltage applied to the grid of the valve 16 is made more positive with respect to the voltage of its cathode, valve 16 conducts an increased current, and this increased current produces an increased voltage drop across the resistors 30 and 31. This increased voltage drop makes the voltage of the cathode of the valve 17 more positive with respect to the voltage of its grid than the voltage of the cathode of the valve 16 is with respect to the voltage of its grid owing to the fact the voltage of the grid of valve 17 does not change. Consequently, the current conducted by the valve 17 is decreased by substantially the same amount that the current of the valve 17 is increased. The result is that the excitation of the control field winding 3a is increased and that of the control field winding 3b is decreased to produce a net excitation of the generator 3 of a polarity which may be assumed to be the polarity for effecting rotation of the motor 1 in the forward direction.

If the voltage supplied to the grid of the valve 16 is decreased instead of increased, i. e., made more negative with respect to the voltage of its cathode, the reverse action takes place. That is to say, the polarity of the net excitation of the generator 3 is reversed so that the motor 1 rotates in a reverse direction.

A voltage proportional to the speed of the motor is supplied between the center bus 21 and the terminal 2b by suitable means, such as a tachometer generator 36 which is driven by the motor 1. The armature connections of this tachometer generator are such that if the motor 1 is rotating in a forward direction the negative brush of the tachometer generator is connected to the conductor 21 and the positive brush is connected to the terminal 2b. When the motor 1 is rotating in the reverse direction, the polarity of these brushes is reversed.

The voltage at the central or zero position of the speed adjusting rheostat 2 is the same as the voltage of the center bus 21 to which the cathode potentiometer 18 is connected. There is thus applied between the cathode and grid of the valve 15 a voltage which is proportional to the difference between the voltage generated by the tachometer generator 36 and the voltage between the center point of the speed adjusting rheostat 2 and the voltage at the point on the rheostat to which the slider 2a is moved.

In operation, movement of the slider 2a in a downward direction results in making the voltage of the grid 15b more negative with respect to the voltage of the cathode 15c thereby to decrease the current conducted by the valve 15. As a result of the decreased current, the voltage drop across the resistor 22 is correspondingly decreased and the voltage across the resistors 34 and 35 correspondingly increased. This increases the current conducted by the valve 16 and correspondingly decreases the current conducted by the valve 17 which results in a net excitation of the generator 3 of such a polarity to cause the motor 1 to rotate in a forward direction. The motor accelerates, thereby causing the tachometer generator 36 to generate a signal voltage proportional to speed and having a polarity as indicated by the plus and minus signs adjacent its brushes. The speed of the motor continues to increase until a balanced condition is established with the motor operating a speed corresponding to the magnitude of the reference voltage between the center point of the rheostat 2 and the slider.

Movement of the slider 2a in a reverse direction from the central position effects rotation of the motor 1 in the opposite direction at a speed corresponding to the magnitude of the reference voltage.

The relationship between the net field excitation of the generator 3 and the voltage between the grid 15b and the center bus 21 is illustrated in the chart of curves of Fig. 2. In this chart, abscissae represent the grid to center bus voltage and ordinates represent the net field excitation of the generator.

The sensitivity of the system may be defined as the ratio of the restoring force to the system error which produces it. Thus, the sensitivity is proportional to the ratio of the change in the net field excitation of the generator to the change in grid to center bus voltage. In other words, the sensitivity is the slope of a curve representing the relationship between the grid to center bus voltage and the net field excitation of the generator.

The manner in which the sensitivity of the system may be changed without effecting any change in the output, i. e., any change in the net field excitation of the generator or speed of the motor, is as follows:

It is preferable that sensitivity changes be effected under the conditions which usually prevail in the operation of the system, i. e., under the usual conditions of load and speed of the motor 1. This condition is referred to as the normal operating point. It may be assumed that the net excitation of the generator corresponding to this normal operating point is represented by the ordinate of the point 37. With the system operating at the normal operating point, the ammeters 32 and 33 in the control field circuits of the generator are read and the readings noted. The grid 15b is then directly connected to the center bus 21 by means of a jumper which is indicated by the dotted line 38. The slider 23a of the sensitivity adjusting resistor is then moved in a clockwise direction to the all resistance out position. These steps result in changing the net field excitation of the generator and this change is indicated by new and different readings of the ammeters.

While observing the ammeters, the slider 18a of the potentiometer 18 is adjusted until the readings of the ammeters are the same as those which were noted with the system operating at the normal operating point. Thus, the net field excitation is restored to the normal value which is represented by the ordinate of the point 37. Then, while continuing to observe the ammeters, the slider of the sensitivity adjusting resistor 23 is moved in a counter clockwise direction to the all resistance in position. If the voltage of the cathode 15c is different from the voltage at the slider 18a of potentiometer 18, the insertion of the sensitivity adjusting resistor will vary the output which will be indicated by a changed reading of the ammeters. Finally, the resistor 24 is varied to balance out the variation produced by the insertion of the sensitivity changing resistor. In other words, the resistor 24 is varied until the net field excitation of the generator is restored to the normal value represented by the ordinate of point 37. Since the grid voltage is zero the system is operating at the point 37. At this point the voltage of the cathode 15c is equalized with the voltage at the slider 18a and the jumper may be removed.

With the slider 23a of the sensitivity adjusting resistor in the all resistance in position, the relationship between the net excitation of the generator and the voltage between the grid and center bus is represented by the curve 39. Since the point 37 represents the net excitation of the generator at zero grid voltage with the resistance 23 all inserted, the curve 39 passes through the point 37. The slope of this curve is seen to be relatively small. It indicates a condition of low or minimum sensitivity. For operation at increased sensitivities, the slider 23a is moved to cut out progressively increasing amounts of the resistor 23. The relationship between the net excitation of the generator with progressively increasing amounts of resistor 23 cut out are represented by the curves 40, 41, and 42. The curve 42 represents the relationship with all the resistance cut out. Its slope is maximum and it therefore represents a condition of maximum sensitivity. For intermediate effective values of the resistance 23, corresponding intermediate values of sensitivity are obtained as represented by the slopes of curves 40 and 41. Since at zero grid voltage and a net excitation of the generator represented by the point 37 variations of the sensitivity adjusting resistor 23 produces no change in the net excitation, all of the curves pass through the point 37.

The relationships between the net excitations and the grid center bus voltage of an uncompensated sensitivity adjusting system are represented by the curves 43, 44, 45 and 46 of Fig. 1 which have slopes that are equal to the slopes of the curves 39, 40, 41 and 42 respectively. Since these curves do not pass through a common point of grid voltage and net excitation within the operating limits of the system, a transition from one curve to another, i. e., a variation in sensitivity, is accompanied by a change in output.

A corollary advantage of the invention is that a variation of the sensitivity at any operating point other than at the intersection of the curves produces a smaller change in the output than that produced by the same variation in sensitivity of the uncompensated system.

For example, consider the system of Fig. 1 operating at a grid voltage and net excitation represented by the point 47 on the curve 42. If the slider 23a is moved to insert all the resistance, a transition is effected from the curve 42 to the curve 39. This results in a change in net excitation which is proportional to the change in grid voltage represented by the distance between the point 47 and a point 48 on the curve 39 having an ordinate which is approximately .7 of 1 per cent less than the ordinate of the point 47. If the uncompensated system is operating at the same output as represented by the point 49 on curve 46 and the sensitivity is changed by inserting all of the resistor 23, a transition is effected to the curve 43. This results in a change in net excitation which is proportional to the change in grid voltage which is represented by the distance between the point 49 and the point 50 on curve 43 which has an ordinate approximately 20 per cent less than ordinate of the point 49.

It is possible to effect variations in sensitivity without effecting changes in the output at operating points other than that represented by point 37. Any voltage within the range of grid voltages may be supplied between the grid 15b and the center bus, and the potentiometer 18 may be adjusted for any net excitation between the maximum values of either polarity. The resistor 24 may then be adjusted to equalize the voltage of the cathode with the voltage of the slider in the manner described in the foregoing. The curves 39, 40, 41 and 42 will then pass through an operating point having an abscissa representing such selected grid voltage and an ordinate representing such net excitation. Consequently, the transition from one sensitivity to another may be effected at such new operating point without producing any change in the output, that is, any change in the net excitation of the generator or the speed of the motor.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A control system comprising in combination a source of voltage, a potentiometer connected across said source and provided with a sliding contact, an electric valve provided with an anode, a cathode and a control grid and having its anode-cathode circuit connected between one side of said source and said sliding contact, means for varying the sensitivity of control of said valve comprising a variable resistor connected between said cathode and said sliding contact, a second source having its positive side connected to the negative side of said first source to provide voltages that are negative with respect to the voltage of said cathode, a source of control voltage connected between said grid and said negative side of said first voltage source, and means for maintaining the anode current of said valve constant while adjusting said resistor to change said sensitivity comprising an adjustable resistor connected between said cathode and the negative side of said second source.

2. A control system comprising a voltage divider, positive and negative supply conductors connected to said divider, a third conductor connected to a point on said divider of intermediate voltage, a potentiometer connected across said positive and third conductors and provided with a movable contact, an electric valve provided with an anode, a cathode and a control grid and having its anode-cathode circuit connected between said first conductor and said movable contact, a source of control voltage connected between said grid and said point of intermediate voltage, means for varying the sensitivity of control of said valve comprising a variable resistor connected in circuit between said cathode and said movable contact, and means for maintaining the anode current of said valve constant during adjustment of said resistor to vary said sensitivity comprising a second variable resistor connected between said cathode and said negative supply conductor for equalizing the voltage of said cathode with the voltage of said movable contact.

3. A control system comprising positive and negative supply conductors, a third supply conductor having a voltage intermediate the voltages of said positive and negative conductors, a potentiometer connected across said positive and third supply conductors and having a movable contact, an electric valve provided with an anode, a cathode and a control grid and having its anode connected to said positive supply conductors and its cathode connected to said movable contact to provide for adjusting the anode current to a desired predetermined value, a source of control voltage connected between said grid and said intermediate voltage conductor, means for varying the sensitivity of control of said valve comprising a variable resistor connected in circuit between said cathode and said movable contact, and means for maintaining the output current of said valve constant at said predetermined value during adjustment of said resistor to vary said sensitivity comprising a second variable resistor connected between said cathode and said third conductor for equalizing the voltage of said cathode with the voltage of said movable contact.

4. A control system for a dynamo electric machine provided with a control device for varying the operating characteristic thereof comprising positive and negative supply conductors, a third conductor having a voltage intermediate the voltages of said positive and negative conductors, a source of control voltage, a potentiometer connected across said positive and intermediate voltage conductors and provided with a movable contact, means for controlling said operating characteristic of the dynamo electric machine comprising an electric valve provided with an anode, a cathode and a control grid and an electrical connection from the anode-cathode circuit of said valve to said control device for rendering said device responsive to variations in the current of said anode-cathode circuit, said valve having said grid connected to said control voltage source and said anode connected to said positive conductor and said cathode connected to said movable contact to provide for adjusting said operating characteristic of said machine to a predetermined value, means for varying the sensitivity of control of said valve comprising a variable resistor connected in circuit between said cathode and said movable contact, and means for maintaining said characteristic constant at said predetermined value during adjustment of said resistor to vary said sensitivity comprising a second variable resistor connected between said cathode and said negative conductor for equalizing the voltage of said cathode with the voltage of said movable contact.

5. A control system for a dynamo electric machine provided with a control field winding comprising positive and negative supply conductors, a third supply conductor having a voltage intermediate the voltages of said positive and negative conductors, a source of control voltage, a potentiometer connected across said positive and intermediate voltage conductors and means adapted and arranged to control the excitation of the dynamo electric machine to control a terminal electrical characteristic thereof comprising an electric valve provided with an anode, a cathode and a control grid and a connection from the anode-cathode circuit of said valve to said control field winding to provide for varying the energization of said control field winding in response to variations in the current in said anode-cathode circuit, said valve having said grid connected to said source of control voltage and having its anode connected to said positive conductor and having its cathode connected to said potentiometer to provide for adjusting said characteristic to a predetermined value, means for varying the sensitivity of control of said valve comprising a variable resistor connected in circuit between said cathode and said potentiometer, and means for maintaining said characteristic at said predetermined value during sensitivity adjustments comprising a second variable resistor connected between said cathode and said negative supply conductor for adjusting the voltage of said cathode to reduce the current in said first resistor to zero.

6. A control system for a dynamo electric machine provided with a control winding comprising positive and negative supply conductors and a third supply conductor having a voltage intermediate the voltages of said positive and negative conductors, a source of control voltage, means for controlling the excitation of the dynamo electric machine to control said operating characteristic thereof comprising an electric valve provided with an anode, a cathode and a control grid, and an electric valve amplifier having an input circuit connected to the anode-cathode circuit of said valve and an output circuit connected to said winding for varying the energization thereof in response to variations in the current in said anode-cathode circuit, said valve having said grid connected to said source of control voltage and having its anode-cathode circuit connected across said positive and intermediate voltage conductors, a potentiometer connected across said positive and intermediate voltage conductors and operatively connected with said cathode for adjusting said characteristic to a predetermined value, a sensitivity adjusting resistor connected in circuit between said cathode and potentiometer, and means for maintaining said characteristic constant at said predetermined value during sensitivity adjustments comprising a variable resistor connected between said cathode and said negative supply conductor to provide for equalizing the voltage of said cathode with the voltage of the point of connection of said sensitivity adjusting resistor to said potentiometer.

ORRIN W. LIVINGSTON.

REFERENCES CITED

The following references are of record in the file of this patent:

UNITED STATES PATENTS

| Number | Name | Date |
|---|---|---|
| 2,003,992 | Cockrell | June 4, 1935 |
| 2,106,831 | Dawson | Feb. 1, 1938 |
| 2,252,057 | Blessing | Aug. 12, 1941 |
| 2,304,552 | Deerhake | Dec. 8, 1942 |
| 2,421,632 | Livingston | June 3, 1947 |

FOREIGN PATENTS

| Number | Country | Date |
|---|---|---|
| 344,096 | Great Britain | Mar. 5, 1931 |
| 730,583 | France | May 17, 1932 |